United States Patent
Sheward

[15] 3,705,599
[45] Dec. 12, 1972

[54] UNIVERSALLY-MOUNTABLE GAS SERVICE REGULATOR

[72] Inventor: Marvin L. Sheward, R.R. No. 1, Frankton, Ind. 46044

[22] Filed: July 29, 1970

[21] Appl. No.: 59,106

Related U.S. Application Data

[63] Continuation-in-part of Ser. No. 762,199, Sept. 16, 1968, abandoned.

[52] U.S. Cl.............................137/116.5, 137/505.11
[51] Int. Cl.........................G05d 11/00, F16k 31/12
[58] Field of Search......137/116.5, 315, 382, 505.11; 251/65

[56] References Cited

UNITED STATES PATENTS

| | | | |
|---|---|---|---|
| 3,160,169 | 12/1964 | Peterson | 137/315 |
| 3,330,295 | 7/1967 | Peterson | 137/382 |
| 3,393,694 | 7/1968 | Baker | 137/116.5 |
| 3,042,064 | 7/1962 | Pommersheim | 137/116.5 |
| 3,599,658 | 8/1971 | Kruzan | 137/116.5 |

*Primary Examiner*—Alan Cohan
*Attorney*—Barthel & Bugbee

[57] ABSTRACT

This gas service regulator is mountable to place the vent in any desired position by providing a multi-component casing and by making the upper and intermediate components of the casing adjustably rotatable relatively to one another and to the lower casing component by means of split channel clamping rings of wedge-shaped cross-section which also eliminate the need for the bolt holes and bolts customarily used. The internal relief valve mechanism can be removed from the upper and intermediate casing components without disassembling the remainder of the remainder of the regulator. A stop bracket limits the range of motion of the lower diaphragm plate. The external breather valve disc contains a vent hole. The regulator valve member is made in two parts which are yieldably held together by being permanently magnetized so as to enable their separation and withdrawal through an access opening normally closed by a threaded plug.

1 Claim, 4 Drawing Figures

INVENTOR
MARVIN LEE SHEWARD

BY Barthel & Bugbee

ATTORNEYS

UNIVERSALLY-MOUNTABLE GAS SERVICE REGULATOR

This is a continuation-in-part of my co-pending application Ser. No. 762,199, filed Sept. 16, 1968 for Universally-Mountable Gas Service Regirator, a written declaration of abandonment of which, effective Aug. 4, 1970, has been filed by me under Rule 138, concurrently with the filing of the present application.

Figure 1:
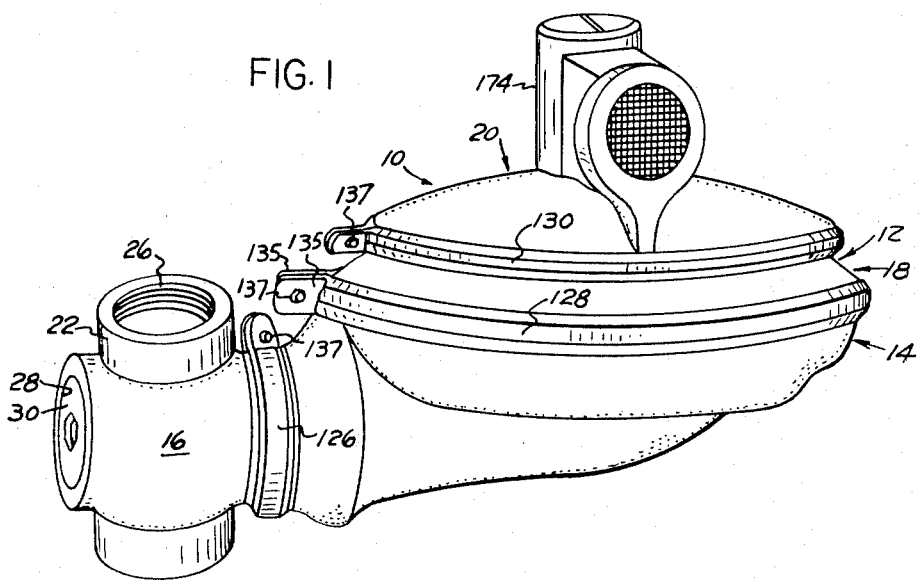
FIG. 1 is a perspective view of a gas service regulator, according to one form of the invention, showing the rotatable adjustment of the upper and intermediate casing components by wedging discontinuous clamping rings
Figure 4:
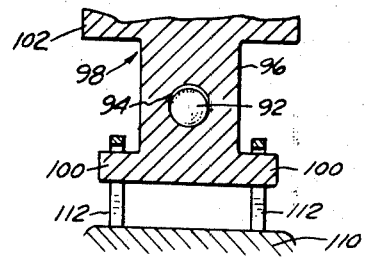
FIG. 4 is a fragmentary vertical section taken along the line 4—4 in FIG. 2.
Figure 2:
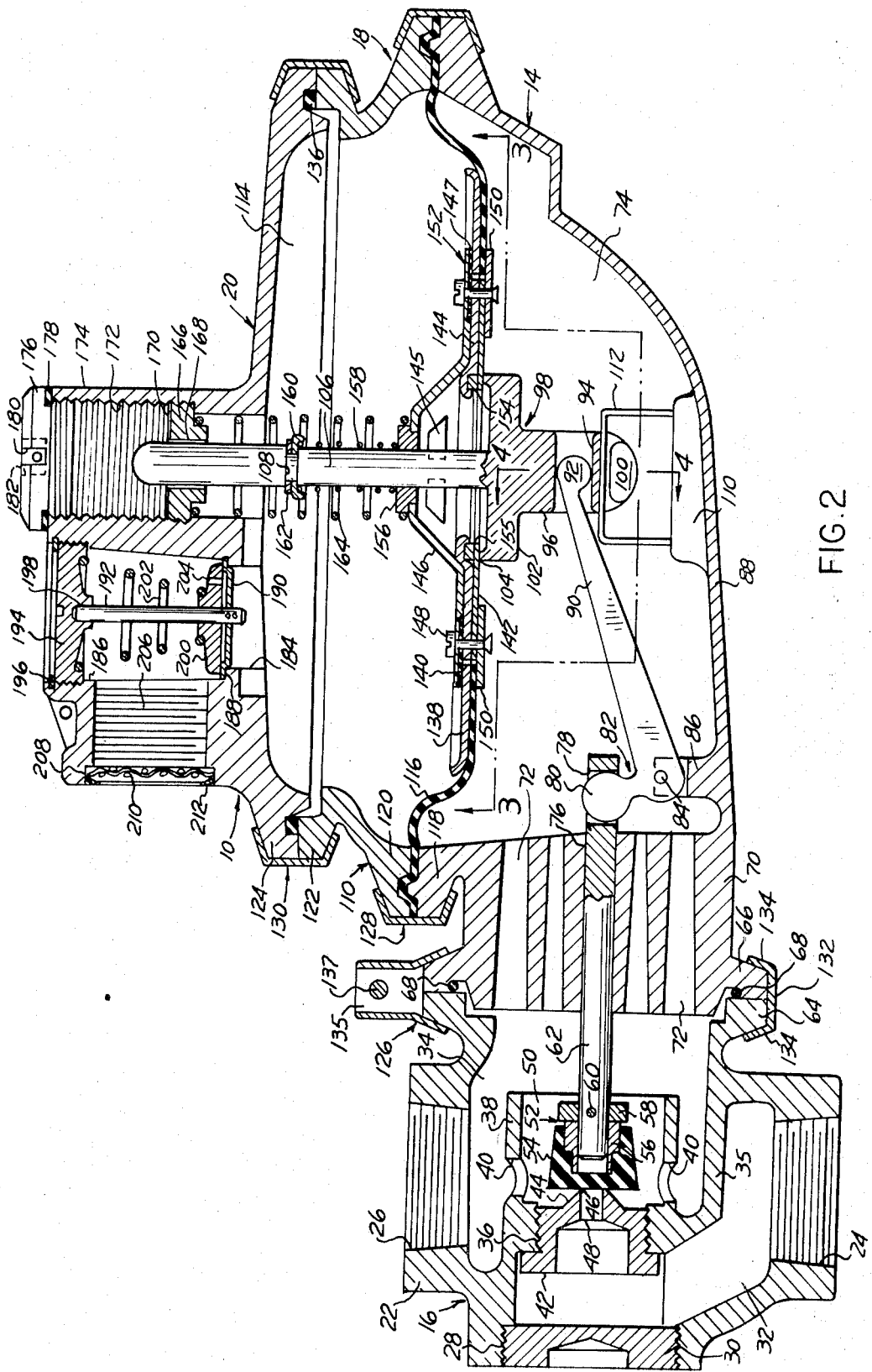
FIG. 2 is a central vertical section, upon an enlarged scale of the gas service regulator shown in FIG. 1.

Referring to the drawings in detail, FIGS. 1 and 2 show a gas service regulator, generally designated 10, according to one form of the invention as housed in a four-part casing 12 including a main casing component 14 to one side of which is attached a service valve casing component 16 and on top of which is mounted an intermediate component 18 carrying an upper spring casing component 20. The service valve casing component 16 includes a body 22 having at the bottom and top thereof internally-threaded gas inlet and outlet ports 24 and 26 respectively and at its outer end an internally-threaded access opening 28 closed by a removable screw plug 30. The inlet port 24 opens into an inlet passageway 32, whereas the outlet port 26 opens out of an outlet passageway 34, these passageways being separated from one another by an internal partition 35 containing an internally-threaded inlet valve port 36 opening into a tubular skirt 38 with circumferentially-spaced wall ports 40 therein.

Threaded into the inlet valve port 36 is a flanged externally-threaded inlet valve seat plug 42 having an inwardly-projecting conical portion 44 terminating in an annular valve seat 46 surrounding a stepped inlet valve passageway 48 extending through the plug 42 from the inlet passageway 32 to the skirt passageway 50. Engageable with the valve seat 46 is a separable gas service valve member, generally designated 52. The valve member 52 consists of a cup-shaped valve pocket member 54 bonded or otherwise secured to a permanently magnetized tubular steel core 56 which in turn is magnetically attracted to an annular permanently magnetized abutment member 58 drilled to receive a pin 60 which secures it to a reciprocable valve rod 62 slidably fitting the tubular core 56. The valve pocket member 54 is preferably made of synthetic rubber or resilient synthetic plastic material which is resistant to the chemical ingredients of natural or manufactured gas.

The body 22 terminates in an annular tapered flange 66 which engages a corresponding but oppositely-tapered flange 66 face-to-face with an O-ring or other suitable sealing gasket 68 disposed therebetween. The flange 66 is located upon a tubular extension 70 of the main casing component 14. The extension 70 forms an end wall pierced by multiple gas flow passageways 72 leading from the outlet passageway 34 into the lower chamber 74 in the main casing unit 14. The end wall 70 also contains a central bore 76 in which the intermediate portion of the valve rod 62 is reciprocably mounted. The inner end portion of the valve rod 62 is provided with a transverse bore 78 which is slidably engaged by the ball-ended outer arm 80 of a bellcrank lever 82 pivotally mounted on a pivot pin 84 supported by an upstanding boss 86 on the bottom wall 88 of the main casing component 14. The inner arm 90 of the bellcrank lever 82 is also ball-ended at 92 within a bore 94 in the coupling head 102 of a value plunger 96 (FIG. 3) of a removable relief valve assembly, generally designated 98. The plunger 96 is provided at its lower end with laterally-projecting lugs 100 and at its upper end with an enlarged top 102 with an annular rib 104 thereon. The head 96 has a stem 106 with a groove 108 in the upper portion thereof.

Extending upward from the bottom wall 88 (FIGS. 2 and 3) is a boss 110 in which are seated the lower ends of a pair of laterally-spaced inverted U-shaped stop brackets 112 engaging the lateral lugs 100 of the head 96. Separating the lower chamber 74 from an upper chamber 114 is a circular flexible diaphragm 116. The upper chamber 114 lies within the casing components 18 and 20. The diaphragm 116 is of elastic deformable material, such as synthetic rubber or resilient synthetic plastic clamped between tapered annular flanges 118 and 120 at the top of the main casing component 14 and intermediate casing component 18 respectively. The top of the intermediate casing component 18 in turn is provided with a similar tapered annular flange 122 which engages a corresponding oppositely-tapered annular flange 124 at the bottom of the upper casing component 20. The valve rod 62, bellcrank lever 82 and plunger 96 constitute motion-transmitting means between the diaphragm 116 and separable valve member 52.

The tapered flanges 64–66, 118–120 and 122–124 are clamped into wedging engagement with one another by discontinuous wedging clamping rings 126, 128 and 130 respectively of similar construction and of truncated V-shaped channel cross-section. Each clamping ring 126, 128 and 130 has a central portion 132 and flared side flanges 134 which perform a wedging action in urging their respective tapered flanges 64–66, 118–120 or 122–124 together into sealing engagement with the O-ring 68, the diaphragm 116 or an annular sealing gasket 136 respectively. The sealing gasket 136 is also of elastic deformable material, such as synthetic rubber or resilient synthetic plastic. Each annular split clamping ring 126, 128 or 130 has its opposite ends 135 forced together by a clamping bolt 137, whereupon the channel-shaped form of the clamping rings urges and wedges their respective tapered flanges 64–66, 118–120 and 122–124 together into sealing engagement with their respective sealing members 68, 116 and 136.

An annular diaphragm reinforcing disc or diaphragm retainer member 138 with an upturned edge is bonded to the diaphragm 116 around a circular central opening 140 therein. Mounted within the central opening 140 are annular lower and upper discs 142 and 144 of synthetic rubber and metal respectively, the latter being spot-welded to a dished circular relief valve cap 146 having side wall openings 145 therein. An annular resilient sealing gasket 147 of suitable elastic deformable material, such as synthetic rubber, is mounted between the periphery of the relief valve cap 146 and the periphery of the adjacent upper disc 144 outward of the spot-welded connection therebetween and overlapping the edge of the central opening 149 into sealing engagement with the adjacent portion of the diaphragm reinforcing disc 138. This gasket 147 is inserted between the members 144 and 146 prior to the spot-welding operations thereon.

Figure 3:
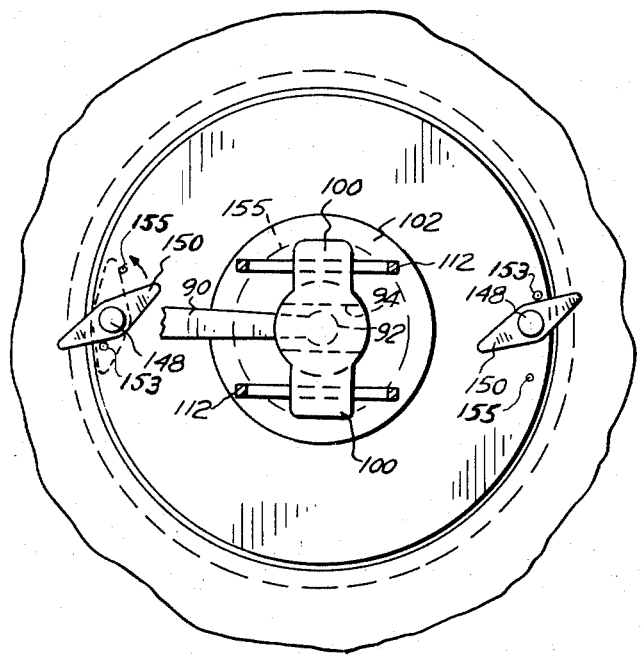
FIG. 3 is a fragmentary bottom plan view, looking in the direction of the line 3—3 in FIG. 2.

The annular discs 142 and 144 and the relief valve cap 146 are drilled at diametrically opposite locations to receive rotary latch-operating pins 148. The heads of the pins 148 are slotted for the reception of the end of a screw driver blade and the shanks are welded or otherwise secured at their upset lower ends to elongated latches 150. The latches 150 when in radial positions retain the assembly 152 of the above discs in the central opening 140, but when turned into tangential positions enable the assembly 152 to be removed therefrom. Mounted on the annular disc 142 adjacent each latch 150 are two latch stops for limiting the arc of swing of each latch, namely a latched stop 153 and an unlatched stop 155. These stops enable the operator to know exactly when each latch 150 is in its latched or unlatched position, even though it is concealed and only the head of each latch-operating pin 148 is visible at the time. The latch stops 153 and 155 are conveniently in the form of rivets seated at the appropriate locations in the disc 142 as shown in FIG. 3. A resilient sealing ring 154 of sponge rubber or the like is bonded to the disc 142, which is engaged by the annular rib 104 on the head 98 around a central relief valve port 155 in the disc 142.

The relief valve cap 146 is bored centrally to receive an annular flanged guide bushing 156 through the central bore of which the stem 106 slidably passes. A helical inner compression spring 158 surrounds the stem 106 with its lower end engaging the guide bushing 156 and with its upper end engaging a radially-slotted cupped washer 160 seated in the annular groove 108 in the stem 106 and held in place by a snap ring 162.

A helical outer compression spring 164 surrounds both the stem 106 and the inner spring 158 and its lower end engages the top of the relief valve cap 146. The upper end of the outer spring 164 is seated against a threaded disc 166 having a central hole 168 of hexagonal cross-section through which the upper end portion of the stem 106 passes. The threaded disc 166 is adapted to be rotated either by a hexagonal rod wrench ("Allen wrench", not shown) inserted in the hole 168 or by a screw driver inserted in a screw driver slot 170 in the upper side of the threaded disc 166. The threaded disc 166 is threaded into the internally-threaded bore 172 of an upstanding hollow boss 174 on the upper component 20. The upper end of the bore 172 is closed by an externally-threaded screw plug 176 engaging a sealing washer 178 of elastic deformable material. The screw plug 176 is provided with a screw driver slot 180 and also with a central wrench socket 182 of hexagonal cross-section.

The spring casing component 20 is also provided with a vent port 184 (FIG. 2) opening into a tapered counterbore 186 in the boss 174 terminating at its lower end in an annular valve seat 188. The valve seat 188 is engaged by the annular rim of a spider 190 pinner or otherwise secured to a guide rod 192. The upper end of the tapered counterbore 186 is threaded and receives an externally-threaded plug 194 above which it is grooved to receive a snap ring 196 which prevents unscrewing of the plug 194. The central portion of the plug 194 is provided with a recess 198 which receives the upper end of the guide rod 192. Slidably mounted on the guide rod 192 and engaging the annular rim of the spider 190 is a vent valve disc 200 which is urged downward by a conical coil spring 202, the upper end of which is seated against the screw plug 194. The vent valve disc 200 is provided with a restricted orifice or bleed hole 203. As its name signifies, the spider 190 has spokes connecting its central portion to its outer annular rim so as to permit gas to pass between the spokes when the vent valve 200 is forced upward against the thrust of the coil spring 202 so as to permit the gas to escape through the internally-threaded vent passageway 206. The vent passageway 206 terminates at its outer end in a counterbore 208 in which a screen 210 is held in place by an annular externally-toothed spring washer 212.

In the installation of the gas service regulator 10, which is located outside the building in the open air, the threaded inlet port 24 is threaded onto the gas supply pipe (not shown) prior to connecting the service valve casing component to the main casing component 14. When the body 22 thereof has reached its final position in this manner, its flange 64 is placed against the flange 66 with the sealing member 68 in position, whereupon the split clamping ring 126 is placed around the abutting flanges and the clamping bolt 137 inserted through the adjoining ends and tightened, its wedging action exerted by its side flanges 134 causing the flanges 64 and 66 to be forced tightly together and clamped in the desired position of the main casing component 14. The similar clamping ring 128 of larger diameter which clamps the periphery of the diaphragm 116 between the flanges 118 and 120 of the main and intermediate casing components 14 and 18 has already been tightened. The upper channel clamping ring 139 is loosened during installation, the upper casing component 20 rotated to place the vent passageway 190 in the desired location and direction, and the clamping ring 130 retightened to lock the upper casing component 20 in fixed position relatively to the intermediate casing component 18.

In the operation of the invention, let it be assumed that the inlet port 24 has been connected to a source of gas under pressure and that the outlet port 26 is connected to the appliances or equipment to be supplied with gas at a desired reduced pressure by the gas service regulator 10. Let it also be assumed that the nut 166 has been adjusted upward or downward within the threaded bore 172 to obtain the correct pressure exerted by the spring 164 to cause the regulator 10 to deliver the desired pressure of gas to the outlet port 26 in the manner described below.

As the gas flows inward through the inlet port 24 and inlet passageway 32 through the valve passageway 48, it acts against the area of the valve pocket member 54 exposed within the valve seat 46 and pushes it and the valve rod 62 to the right (FIG. 2), rocking the bellcrank lever 82 clockwise around its pivot pin 84. This action causes the gas to flow through the passageways 72 and fill the chamber 74 beneath the diaphragm 116. As a result, the valve 116 and diaphragm plunger 96 tend to be pushed upward against the thrust of the outer helical spring 164 so as to rock the bellcrank lever 82 counter-clockwise around its pivot pin 84 and thereby shift the valve rod 62 and valve member 52 to the left toward the valve seat 46, reducing the flow of gas past the pocket member 54 of the valve member 52. As a consequence of these opposing actions, a balanced condition is achieved whereby gas at the desired reduced pressure determined by the outer helical spring 164 and diaphragm 116 flows past the valve seat 46 and outward through the gas outlet passageway 34 and outlet port 26 to the appliances being supplied with the gas.

Meanwhile, the valve plunger 96 is also being urged upward by the force exerted upon its stem 106 by the inner spring 158. If at any time an excessive gas pressure should develop within the main casing chamber 74, it forces the diaphragm 116 upward beyond its normal limits against the combined pressures of the outer and inner springs 164 and 158, but the upward travel of the diaphragm plunger 96 is soon halted by the engagement of its laterally-projecting lugs 100 with the stop brackets 112. As the diaphragm 116 continues to move upward, however, carrying with it the cap 146 and annular discs 144 and 142, the disc 142 moves upward away from the annular rib 104 on the now-halted top 102 of the head 98, opening up a gas therebetween. As a consequence, the excess gas flows upward through this gap and escapes through the central relief valve port 154, side wall openings 145 of the cap 146 into the upper chamber 114 where it pushes the vent valve disc 200 upward off its seat 188. Thereupon the excess gas flows upward through the vent port 184 and vent passageway 206 into the open air. Otherwise the bleed orifice 204 constantly vents the upper chamber 114.

Should it be necessary to repair or replace the assembly 152, the clamping ring 130 is removed and the upper casing component 20 is then lifted off bodily away from the intermediate casing 18. The pins 148 are then rotated by means of a screw driver until their latches 150 swing inward within the opening 140. The assembly 98 may then be lifted out and removed, together with the valve plunger 96 by moving the latter sidewise until its bore 94 moves off the ball end 92 of the bellcrank lever 82. Replacement follows the reverse of the procedure described above.

Should it be deemed necessary to remove the diaphragm 116, the operator removes the channel clamping ring 128 and lifts off the upper or spring casing component 20 and the intermediate casing component 18 away from the main lower casing component 14, thereby unclamping the periphery of the diaphragm 116. He then removes the snap ring 162 and the slotted cupped washer 160 from the stem 106 and by means of a screw driver rotates the pins 148 and latches secured thereto into their unlatched positions (FIG. 3), whereupon he may then lift out the assembly 152 as described above and thus detach them from the inner periphery of the diaphragm 116.

If at any time it should become necessary to repair or replace the valve pocket 54 in the present gas service regulator, this can be done without disassembling the regulator. To accomplish this, the operator unscrews the threaded plug 30 from the access opening 28 and removes it, then unscrews the valve seat plug 42 from the inlet valve port 36 and removes it through the access opening 28. He then grasps the valve pocket 54 with suitable pliers or tongs and pulls outward upon it with sufficient force to overcome the magnetic attraction between the permanently magnetized members 56 and 58, causing the former to become detached from the latter and to be removed by sliding it off the end of the valve rod 62 and withdrawn through the openings 36 and 28. Replacement of the valve pocket 54 is performed by reversing the removal procedure just described.

If repair or replacement is required for the vent valve 186, this can be accomplished from outside the regulator 10 without disassembling it. To do this, the operator constricts and removes the snap ring 196 by pulling together the spaced ends (not shown). He then unscrews and removes the screw plug 194, exposing the guide rod 192, which he then lifts out, along with the spring 202, vent valve member 200 and spider 190. Replacement follows the reverse procedure.

I claim:
1. A gas service regulator, comprising
a multi-component casing including
    a service valve casing component (16) having therein a service valve seat (46) with gas inlet (24) and outlet (26) passageways communicating therewith and having a gas service valve member (52) movable into and out of flow-regulating relationship with said service valve seat (46),
    a main casing component (14) disposed adjacent said service valve casing component (16) and having motion-transmitting mechanism (82) therein operatively connected to said gas service valve member (52),
    an intermediate casing component (18) disposed adjacent said main casing component (14) and having a resilient diaphragm (116) disposed therebetween and operatively connected to said motion-transmitting mechanism (82),
    and a spring casing component (20) disposed adjacent said intermediate casing component (18) and having therein a pressure-regulating spring (164) operatively connected to said diaphragm (116),
means (126, 128, 130) for clamping said adjacent casing components together,
said diaphragm (116) having a relief valve assembly opening (140) therethrough,
a spring-pressed relief valve assembly (98) including
    a relief valve supporting structure removably mounted in said spring casing component (20) in closing relationship with said opening (140) and containing a valve port with a valve seat therearound,
    a diaphragm retainer member (138) disposed adjacent said opening (140) and secured to said diaphragm (116),
    a valve plunger reciprocably mounted in said supporting structure and having a valve head movable into and out of closing engagement with said valve seat, a valve spring mounted on said valve supporting structure in engagement with said valve plunger and normally urging said valve plunger toward said valve seat into closing engagement with said valve seat, and a looking device (148, 150, 152) mounted on said supporting structure adjacent said opening (140) and accessible and operable from said spring casing component (20) FOR quick-detachably connecting and disconnecting said valve supporting structure respectively to and from said diaphragm (116) and for respectively inserting and removing unitarily through said opening said relief valve assembly including said valve supporting structure with said valve seat and said valve plunger with said valve head and said valve spring.

* * * * *